United States Patent Office 3,574,860
Patented Apr. 13, 1971

3,574,860
MEDICAMENTS COATED WITH SODIUM ETHYL CELLULOSE SULFATE
Richard R. Crawford and Peter M. Grant, both of 755 Ridge Road W. 14615, and Martin E. Rowley and Walter D. Slowig, both of 1669 Lake Ave. 14614, all of Rochester, N.Y.
No Drawing. Filed Mar. 25, 1966, Ser. No. 544,335
Int. Cl. A61k 27/00
U.S. Cl. 424—362         3 Claims

ABSTRACT OF THE DISCLOSURE

A medicament is surrounded by a layer of sodium ethyl cellulose sulfate, with or without a different cellulose derivative and/or a plasticizer. This new composition provides a coating which is glossy, smooth and hard, which is less bulky than sugar, and which disintegrates rapidly in gastric fluids of the stomach. The rate of disintegration in gastric fluids can be controlled by tailoring compositions with different percentages of ingredients for different rates of disintegration.

---

This invention relates to medicaments coated or surrounded with a layer or film of a material which masks medicinal odors and tastes and protects active ingredients against adverse environmental conditions.

In the past many materials have been employed for coating medicaments, among such coating materials being sugar, and various enteric coatings such as cellulose acetate phthalate as disclosed in U.S. Pat. 2,196,768. For cellulose acetate phthalate to be used successfully for coating a medicament which must dissolve in gastric fluids, it must be modified with a water-soluble wax such as polyethylene glycol in accordance with U.S. Pat. 2,881,085, but such coatings are softer and less elegant than desired. Sugar is water soluble and dissolves in the gastric fluids of the stomach, but has the drawback of requiring a long period of time (often as much as six days) to apply the large number of individual coats required primarily due to the slow drying of aqueous solutions. Furthermore, sugar is quite bulky and increases the size of the tablets considerably. Other materials which disintegrate in gastric fluid are of very poor film forming quality.

The cellulose acetate phthalate coatings have been very satisfactory in many respects and add very little to the tablet size. However, cellulose acetate phthalate is enteric in nature, thus does not disintegrate in the gastric fluids of the stomach to release the medicament, but dissolves in the enteric fluids of the intestine.

In accordance with the present invention there has been provided a novel coated medicament wherein the coating is glossy, smooth and hard; which is less bulky than sugar; which dissolves in volatile organic solvents for rapid application and drying, yet which disintegrates rapidly in gastric fluids of the stomach to make the medical qualities available to the patient promptly; and which can be tailored as to composition so as to control the rate of disintegration in gastric fluids.

Our new coating consists essentially of sodium ethyl cellulose sulfate which is applied to the medicament, either alone or in combination with a water-insoluble cellulose derivative and/or a plasticizer. The different cellulose derivative makes it possible to vary the solubility of the coating by varying the ratio of sodium ethyl cellulose sulfate to the water-insoluble cellulose derivative in the mixture. A suitable plasticizer acts to lessen any tendency of the tablets to stick together in the coating pan, and also adds desirable flexibility to preformed capsules and other coatings to reduce brittleness.

Sodium ethyl cellulose sulfate, the principal ingredient of our novel coating composition, is a cellulose derivative described and claimed along with its method of manufacture in U.S. Pat. 3,075,962 which was granted Jan. 29, 1963, to Gordon D. Hiatt and Martin E. Rowley, and the present invention includes the compound within the scope of that patent (the disclosure of which is incorporated by reference herein). When this compound alone is to be applied as a coating on a medicament, it is dissolved in a suitable easily evaporated organic solvent, such as methyl alcohol, or a mixture of acetone or methylene chloride with methyl alcohol, and then is repeatedly applied to the medicament with evaporation of the solvent taking place between repetitions until a protective coating or layer is built up.

When the coating contains not only the sodium ethyl cellulose sulfate but also a different cellulose derivative and/or a plasticizer, it is applied in a similar manner, taking care that the solvent or appropriate mixture of solvents is one which will dissolve all ingredients of the composition. Among the operable cellulose derivatives are ethyl cellulose and such cellulose esters of mono- and dicarboxylic acids as cellulose acetate phthalate, cellulose acetate succinate, cellulose acetate butyrate, cellulose acetate, and ethyl cellulose phthalate.

In general, a 2-component cellulose derivative coating should consist essentially of between 10 and 90% by weight of sodium ethyl cellulose sulfate, the balance being the different cellulose derivative, the proportions depending upon the rate of solution of the coating desired when subjected to the action of gastric fluids. As the proportion of sodium ethyl cellulose sulfate in the coating increases, the rate of solubility of the coating in the gastric fluids of the stomach increases; whereas as the proportion of the different cellulose derivative increases, the rate of solubility in the stomach fluids decreases.

The plasticizers can be any of the well-known compounds used for this purpose as long as they are compatible with the animal system to which they are to be introduced with the medicament. In a 3-component coating, plasticizer advantageously can comprise an effective amount up to 45% by weight, advantageously between 10 and 45% while the sodium ethyl cellulose sulfate is between 10 and 80% and the different cellulose derivative is between 10 and 75%. Among suitable plasticizers are the polyethylene glycols, the propane diols, and diethyl phthalate. Others which can be used are methyl ricinoleate and ethyl ricinoleate; and those other compounds represented by diethyl sebacate, having the formula:

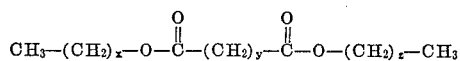

wherein $x$ and $z$ are 0–5, $y$ is 2–12, and $x+y+z$ is 8–12.

In a coating consisting essentially of sodium ethyl cellulose sulfate and plasticizer, the latter should be present in an effective amount up to 45% by weight, advantageously between 10 and 45%.

The substances to be coated, such as powders or pills, can be directly dipped into a solution of the appropriate ingredients. Sometimes it is advantageous that the powder or pill first be coated with or enclosed in gelatin and then be dipped, sprayed or otherwise coated with the solution. The thickness of the coating can be controlled by varying the concentration of the ingredients in the solvent, as well as by the number of times that the ingredients are successively applied to and dried on the powder or pill.

It is also advantageous for some medicaments that the coating be developed by forming the composition of the invention into capsules composed of separate telescoping units into which the medicament is placed. This is done by repeatedly dipping an appropriately shaped pin into the solution as in U.S. Pat. 2,575,789, after which solution is applied at the juncture of the telescoping units to seal them together.

For ease of testing, the coating composition of the invention was applied to tricalcium phosphate-starch granulation tablets. It is to be understood, however, that medicaments such as aspirin, which do not react with the coating material, can be coated. Also, rate of disintegration was measured in a simulated gastirc juice or fluid as described in the U.S. Pharmacopoeia, XVII, pages 919–921. It is prepared by dissolving 2.0 grams of sodium chloride and 3.2 grams of pepsin in 7.0 ml. of hydrochloric acid and sufficient water to make 1000 ml. The solution has a pH of about 1.2.

Coated tablets having glossy, smooth and hard surfaces were obtained in all the following examples. In Examples 2 to 13, and 16 to 18 the coating technique was the same as in Example 1. In Examples 1 to 19, and 21 the sodium ethyl cellulose sulfate was water soluble at room temperature, contained 5–7% sulfur and 34–40% ethoxyl, and was made from ethyl cellulose having 45–47% ethoxyl; in the other examples it was insoluble in water at and above room temperature, contained 4–4.5% sulfur and 41–42% ethoxyl, and was made from ethyl cellulose having 48–49% ethoxyl. All percentages are by weight.

EXAMPLE 1

A solution was prepared containing 10 g. sodium ethyl cellulose sulfate and 5 g. cellulose acetate phthalate dissolved in a mixture of 75 ml. acetone and 25 ml. methanol. Small portions of the solution were added to about 100 tablets (deep concave, $11/32''$ core, tricalcium phosphate-starch granulation) contained in a 1 l. beaker, continuously swirled. After each portion of the solution was added, the tablets were dried with a cold air stream. After 10 coats of the solution had been applied, the tablets were air dried for 25 hours.

The tablets disintegrated in simulated gastric fluid in 35 seconds.

EXAMPLE 2

A solution was prepared containing 7.5 g. sodium ethyl cellulose sulfate and 2.5 g. cellulose acetate succinate dissolved in a mixture of 75 ml. acetone and 25 ml. methanol. Fifteen coats were applied.

The tablets disintegrated in simulated gastric fluid in 25 seconds.

EXAMPLE 3

A solution was prepared containing 6 g. sodium ethyl cellulose sulfate and 9 g. ethyl cellulose dissolved in 100 ml. methanol. Fifteen coats were applied.

The tablets disintegrated in simulated gastric fluid in 15 seconds.

EXAMPLE 4

A solution was prepared containing 10.25 g. sodium ethyl cellulose sulfate and 3.75 g. cellulose acetate dissolved in a mixture of 150 ml. acetone and 50 ml. methanol. Fifteen coats were applied.

The tablets disintegrated in simulated gastric fluid in 30 seconds.

EXAMPLE 5

A solution was prepared containing 7 g. sodium ethyl cellulose sulfate and 8 g. ethyl cellulose phthalate dissolved in 100 ml. methanol. Fifteen coats were applied.

The tablets disintegrated in simulated gastric fluid in 20 seconds.

EXAMPLE 6

A solution was prepared containing 7 g. sodium ethyl cellulose sulfate and 8 g. cellulose acetate butyrate dissolved in 100 ml. methanol. Fifteen coats were applied.

The tablets disintegrated in simulated gastric fluid in 35 seconds.

EXAMPLE 7

A solution was prepared containing 9 g. sodium ethyl cellulose sulfate, 1.5 g. cellulose acetate phthalate, and 4.5 g. polyethylene glycol (600 average mol. wt.) dissolved in a mixture of 75 ml. acetone and 25 ml. methanol. Fifteen coats were applied.

The tablets disintegrated in simulated gastric fluid in 2 minutes.

EXAMPLE 8

A solution was prepared containing 3 g. sodium ethyl cellulose sulfate, 9 g. ethyl cellulose, and 3 g. polyethylene glycol (600 average mol. wt.) dissolved in 100 ml. methanol. Fifteen coats were applied.

The tablets distegrated in simulated gastric fluid in 5 seconds.

EXAMPLE 9

A solution was prepared containing 6 g. sodium ethyl cellulose sulfate, 1 g. cellulose acetate phthalate and 3 g. propylene glycol dissolved in a mixture of 80 ml. acetone and 20 ml. methanol. Fifteen coats were applied.

The tablets disintegrated in simulated gastric fluid in 30 seconds.

EXAMPLE 10

A solution was prepared containing 3 g. sodium ethyl cellulose sulfate, 9 g. ethyl cellulose, and 3 g. propylene glycol dissolved in a mixture of 80 ml. acetone and 20 ml. methanol. Fifteen coats were applied.

The tablets disintegrated in simulated gastric fluid in 5 seconds.

EXAMPLE 11

A solution was prepared containing 9 g. sodium ethyl cellulose sulfate, 1.5 g. cellulose acetate phthalate, and 4.5 g. polyethylene glycol (4000 average mol. wt.) dissolved in a mixture of 160 ml. acetone and 40 ml. methanol. Fifteen coats were applied.

The tablets disintegrated in simulated gastric fluid in 30 seconds.

EXAMPLE 12

A solution was prepared containing 3 g. sodium ethyl cellulose sulfate, 9 g. ethyl cellulose, and 3 g. polyethylene glycol (4000 average mol. wt.) dissolved in a mixture of 80 ml. acetone and 20 ml. methanol. Fifteen coats were applied.

The tablets disintegrated in simulated gastric fluid in 5 seconds.

EXAMPLE 13

A solution was prepared containing 9 g. sodium ethyl cellulose sulfate, 1.5 g. cellulose acetate phthalate, and 4.5 g. polyethylene glycol (1500 average mol. wt.) dissolved in a mixture of 80 ml. acetone and 20 ml. methanol. Fifteen coats were applied.

The tablets disintegrated in simulated gastric fluid in 40 seconds.

EXAMPLE 14

A solution was prepared containing 50 g. sodium ethyl cellulose sulfate, 15 g. cellulose acetate phthalate, 10 g. diethyl phthalate, and 1 g. yellow dye dissolved in a mixture of 800 ml. acetone and 200 ml. methanol. 50 ml. portions of the solution were added to 5 lbs. tricalcium phosphate tablet cores continuously tumbled in a 16'' coating pan. Following the addition of each portion, the tablets were tumbled a short time to ensure complete coverage. A stream of air was directed at the tablets to dry them prior to adding successive portions of solution. After eight coats had been applied, the coated tablets were thoroughly dried to remove all residual solvent.

The tablets disintegrated in simulated gastric fluid in 55 seconds.

EXAMPLE 15

A solution was prepared containing 60 g. sodium ethyl cellulose sulfate, 60 g. ethyl cellulose, 30 g. diethyl phthalate, and 1 g. yellow dye dissolved in a mixture of 800 ml. acetone and 200 ml. methanol. Eight coats were applied as in Example 14.

The tablets disintegrated in simulated gastric fluid in 20 seconds.

EXAMPLE 16

A solution was prepared containing 6 g. sodium ethyl cellulose sulfate, 6 g. ethyl cellulose, 3 g. diethyl sebacate dissolved in 100 ml. of methanol. Fifteen coats were applied.

The tablets disintegrated in simulated gastric fluid in 10 seconds.

EXAMPLE 17

A solution was prepared containing 10 g. sodium ethyl cellulose sulfate, 3 g. cellulose acetate phthalate and 2 g. diethyl sebacate dissolved in 100 ml. of methanol. Fifteen coats were applied.

The tablets disintegrated in simulated gastric fluid in 10 seconds.

EXAMPLE 18

A solution was prepared containing 10 g. sodium ethyl cellulose sulfate and 2 g. diethyl sebacate dissolved in 100 ml. of methanol. Fifteen coats were applied.

The tablets disintegrated in simulated gastric fluid in 10 seconds.

EXAMPLE 19

A solution was prepared containing 10 g. sodium ethyl cellulose sulfate in 100 ml. of methanol. Ten coats were applied.

The tablets disintegrated in simulated gastric fluid in 5 seconds.

EXAMPLE 20

A solution containing 15% water insoluble sodium ethyl cellulose sulfate (4.3% sulfur) in equal parts of acetone and methanol by weight was coated onto tricalcium phosphate tablets by swirling 200 tablets (50 grams) in a 1 l. beaker while adding 3 cc. of solution. After drying in a stream of air, additional coats were applied similarly. The coated tablets were then added to simulated gastric fluid at 37° C. to release the contents. It was noted that the coatings released by swelling and rupturing rather than by dissolving.

| Number of coats: | Coat weight percent of total | Time for release[1] |
|---|---|---|
| 5 | 4.3 | 34 seconds. |
| 10 | 7.4 | 107 seconds. |
| 15 | 10.5 | >30 minutes. |

[1] Average of 3 tablets.

EXAMPLE 21

Example 20 was repeated except for using water soluble sodium ethyl cellulose sulfate containing 5.4% sulfur, which released by dissolving.

| Number of coats: | Coat weight percent of total | Time for release[1] |
|---|---|---|
| 5 | 4.4 | 45 seconds. |
| 10 | 7.0 | 193 seconds. |
| 15 | 10.3 | 787 seconds. |

[1] Average of 3 tablets.

EXAMPLES 22, 23

In tests identical to Example 20, except that the coating solution also contained 33% of a plasticizer (based on weight of sulfate ester) results were similar to Example 20, the plasticizer in one instance being propylene glycol, and in the other being a polyethylene glycol known as Carbowax 1500.

The invention has been described in detail with particular reference to preferred embodiments thereof, but it will be understood that variations and modifications can be effected within the spirit and scope of the invention as described hereinabove and as defined in the appended claims.

We claim:

1. As an article of manufacture, a coated solid medicament having as the coating material a cellulose derivative protective coating, between 10 and 90% by weight of which is sodium ethyl cellulose sulfate, the balance being a different cellulose derivative characterized by relative insolubility in stomach secretions, said coating being non-reactive with said medicament, and being characterized by rapid solubility in gastric fluid.

2. An article of manufacture in accordance with claim 1 wherein said different cellulose derivative is selected from the group consisting of cellulose acetate, cellulose acetate succinate, cellulose acetate phthalate, cellulose acetate butyrate, ethyl cellulose and ethyl cellulose phthalate.

3. An article of manufacture in accordance with claim 1 wherein said coating consists essentially of between 10 and 80% of sodium ethyl cellulose sulfate by weight, between 10 and 45% by weight of a plasticizer selected from the group consisting of polyethylene glycol, propane diol, diethyl phthalate, methyl ricinoleate, ethyl ricinoleate and diethyl sebacate, and between 10 and 75% by weight of a different cellulose derivative selected from the group consisting of cellulose acetate, cellulose acetate succinate, cellulose acetate phthalate, cellulose acetate butyrate, ethyl cellulose and ethyl cellulose phthalate.

References Cited

UNITED STATES PATENTS

| 3,240,617 | 3/1966 | Rowley et al. | 106—169 |
| 2,559,914 | 7/1951 | Frank | 260—215 |
| 2,753,337 | 7/1956 | Klug | 260—215 |
| 2,921,883 | 1/1960 | Reese et al. | 167—82 |
| 2,969,355 | 1/1961 | Malm et al. | 260—215 |
| 3,030,273 | 4/1962 | Zagnoli | 167—82 |
| 3,075,962 | 1/1963 | Hiatt et al. | 260—215 |

OTHER REFERENCES

Whistler, Industrial Gums, published by Academic Press, New York, 1959, pp. 604 and 605.

RICHARD L. HUFF, Primary Examiner

U.S. Cl. X.R.

106—169